United States Patent
Sawada et al.

(10) Patent No.: US 6,472,098 B1
(45) Date of Patent: Oct. 29, 2002

(54) BATTERY DEVICE FOR LOADING ON A MOBILE SYSTEM

(75) Inventors: Hirokazu Sawada, Kanagawa (JP); Ryoichi Yamane, Tokyo (JP); Hideya Takahashi, Fukushima (JP); Yoshikazu Kanaishi, Fukushima (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/450,343

(22) Filed: Nov. 29, 1999

(30) Foreign Application Priority Data

Nov. 30, 1998 (JP) .......................................... 10-340712
Nov. 9, 1999 (JP) .......................................... 11-318723

(51) Int. Cl.$^7$ ................................................ H01M 2/00

(52) U.S. Cl. ........................ 429/163; 429/96; 429/100; 429/148

(58) Field of Search ....................... 429/96, 163, 100, 429/148

(56) References Cited

U.S. PATENT DOCUMENTS

| | | | | |
|---|---|---|---|---|
| 5,385,793 A | * | 1/1995 | Tiedemann | 429/62 |
| 5,666,040 A | | 9/1997 | Bourbeau | 320/6 |
| 5,747,965 A | | 5/1998 | LaPointe et al. | 320/5 |

FOREIGN PATENT DOCUMENTS

| | | | | |
|---|---|---|---|---|
| DE | 44 22 005 A | | 12/1995 | |
| EP | 0 845 383 A | | 6/1998 | |
| FR | 2 774 514 A | | 8/1999 | |
| JP | 407211356 A | * | 8/1995 | .......... H01M/10/44 |
| JP | 09 129272 A | | 5/1997 | |
| JP | 10 162867 A | | 6/1998 | |
| JP | 10 246112 A | | 12/1998 | |

OTHER PUBLICATIONS

"Lithium–Ion Battery Electronic Control System For Electric Vehicle Application"; EVS International Electric Vehicle Symposium, Tokyo; vol. SYMP. 13, 1996 pp. 33–36; XP 000687894; C. Morin et al.

"Advanced Battery System for Electric Vehicle (FEV II)" EVS International Electric Vehicle Symposium, Tokyo; p. 37, col. 1, paragraph 1, p. 40, col. 1, paragraph 1; Takeshi Miyamoto.

* cited by examiner

*Primary Examiner*—Patrick Ryan
*Assistant Examiner*—Mark Ruthkosky
(74) *Attorney, Agent, or Firm*—Rader, Fishman, & Grauer PLLC; Ronald P. Kananen, Esq.

(57) ABSTRACT

A battery device having a large number of secondary cells in which the voltage of a large number of secondary batteries can be detected and controlled to facilitate the handling and to improve the reliability. The battery device is made up of a modular casing 13, a large number of secondary batteries 12 housed in the modular casing 13, plural cell control units 14 and an exterior casing 11 accommodating the modular casing 13. The modular casing 13 has an inner casing member 26 and an outer casing member 27 and has a large number of terminal openings 29, 42 opened in it. The secondary batteries 12 are housed in the modular casing 13 via the terminal openings 29, 42 so that positive terminal 12*a* and negative terminal 12*b* are alternately exposed to outside. A pre-set number of secondary batteries are grouped together as a set, with the totality of the secondary batteries being arranged in a plurality of such sets. The cell control unit 14 has the functions of detecting and controlling the voltage of each battery module and each secondary battery and of inputting and outputting detection and control signals. The exterior casing 11 is provided with a positive electrode terminal 18, a negative electrode terminal 19 and a transmission/reception terminal 20 of the cell control unit 14.

9 Claims, 15 Drawing Sheets

BATTERY DEVICE FOR LOADING ON A MOBILE SYSTEM

BACKGROUND OF THE INVENTION

1. Field of the Invention

This invention relates to a battery device having a large number of secondary batteries. More particularly, it relates to a battery device for loading on a mobile system, such as a, electric vehicle, in which the battery device or an internal combustion engine are selectively switched for use as a driving source.

2. Description of the Related Art

In an automotive vehicle, attention is directed to practical use of an electric vehicle, having a battery device as a driving source, as a substitution vehicle for the gasoline engine vehicle or a diesel engine vehicle, in order to accommodate the problem of resources and environment. For an automotive vehicle, lead accumulators have so far been used as the electric driving source. Thus, in the electric vehicle, development of the driving source has been centered about this lead accumulator. However, a problem is raised in that the accumulator tends to be increased in size and weight in order to realize a practical running distance by charging only once.

Thus, in an automotive vehicle, attempts are conducted towards developing a so-called hybrid car in which a motor and a conventional engine are suitably switched, depending on the running conditions of the vehicle, to suppress the battery device supplying the power to the motor from increasing in size and to realize energy saving and cleanness. On the other hand, a battery device for an automotive vehicle is required to satisfy the specifications for high voltage of tens to hundreds of volts, a high energy density or a high output, so that attempts are being made to adopt a high-performance lithium ion secondary battery in place of the conventional lead cell. For example, in Japanese Laying-Open Patent H-9-86188 entitled "Battery Structure for Electric Vehicles", there is disclosed a battery device for an automotive vehicle having a large number of lithium ion secondary batteries housed in a battery casing.

Meanwhile, if, in a battery device for an automotive vehicle, the above-described specifications are to be satisfied, the voltage state of the large number of the lithium ion secondary batteries needs to be monitored and controlled to a constant state. To this end, a cell control unit having the functions of voltage detection or control or the input/output function for detection or control signals is annexed to the battery device for the automotive vehicle to improve the safety and reliability. The cell control unit carries thereon a micro-processor or electronic parts, and is connected to sensing lines connected in turn to respective lithium ion secondary batteries.

In the battery device for an automotive vehicle, the voltage value of each lithium ion secondary battery, obtained via e.g., a sensing line, is compared to a reference voltage value, and corresponding detection data are sent to the control device. The battery device for the automotive vehicle is controlled to a constant state by charging or discharging of the lithium ion secondary batteries under a control output from the control device.

In the battery device for an automotive vehicle, a large number of the lithium ion secondary batteries are housed within the battery casing, as described above. These lithium ion secondary batteries are monitored and controlled by a cell control unit. Meanwhile, in the conventional battery device for an automotive vehicle, the battery casing and the cell control unit are constructed independently of each other. Thus, in conducting a performance test, for example, it is necessary to interconnect a terminal of the battery casing to the cell control unit, to interconnect the device to a tester and to dismount the connection after the test, by a laborious operation.

On the other hand, in the battery device for the automotive vehicle, since a loading unit for the battery casing and a loading unit for the cell control unit are constructed on the vehicle independently of each other and connected to each other by electric wiring, the loading units are complicated in structure. If the loading units are spaced away from each other, means must be provided for elongated wiring extension and protection for wiring.

On the other hand, it is necessary in the battery device for an automotive vehicle to protect the device against occurrence of inadvertent accidents and to continue the monitoring and control of the lithium ion secondary battery. However, in the battery device for the automotive vehicle, since the battery casing and the cell control unit are constructed independently of each other, it is a frequent occurrence that the operation becomes impossible due to e.g., wiring breakage.

Moreover, in the battery device for an automotive vehicle, which is loaded below a flooring of the automotive vehicle, it is necessary to assure sufficient reliability against the heat radiated from the road surface, flooding in water during running in rainy weather or abrupt changes in temperature. In the battery device for an automotive vehicle, not only the battery casing or the cell control unit but also the wiring needs to be constructed to meet the above requirements, thus complicating the overall structure. In addition, in the battery device for the automotive vehicle, sufficient reliability needs to be maintained against large vibrations occurring during vehicle running.

SUMMARY OF THE INVENTION

It is therefore an object of the present invention to provide a battery device for loading on a moving system in which a cell control unit having the function of detecting or controlling the voltage of the secondary battery or the input/output function of the detection or control signals is built in a modular casing, housing therein a large number of secondary batteries, to assure facilitated handling and improved reliability.

The present invention provides a battery device for a mobile body including a modular casing of synthetic resin, defining a battery casing having a large number of terminal openings opening on both lateral sides, a large number of chargeable secondary batteries loaded in the battery casing, a plurality of cell control units and an exterior casing split into at least two casing halves and which delimits a housing spacing for the modular casing in its inside in the assembled state of the casing halves.

Each set of secondary batteries is loaded in the battery casing of the modular casing so that the positive electrode terminals and the negative electrode terminals are alternately exposed in neighboring terminal openings and so that the secondary batteries are connected in series to one another. A pre-set number of secondary batteries are grouped together as a set, with the totality of the secondary batteries being arranged in a plurality of such sets. The cell control unit includes a micro-processor, circuit elements or electronic components loaded on a circuit board and has the function of detecting and controlling the voltage of each battery module and each secondary battery. The exterior casing is provided with a positive electrode terminal, a negative electrode terminal and a transmission/reception terminal of the cell control unit.

In the above-described battery device for the mobile body according to the present invention, the secondary batteries are loaded in the battery casing of the modular casing and connected in series with one another and to a sensing line. In the battery device for the mobile body, each sensing line is connected to an associated cell control unit and subsequently each cell control unit is assembled to the modular casing. The modular casing is accommodated in the housing spacing of the exterior casing, the secondary battery sets, the positive electrode terminal and the negative electrode terminal are interconnected and the cell control unit is connected to the input/output terminal.

Since the battery device for the mobile body is constructed as what may be termed an all-in-one unit, it is directly loaded on a battery loading unit of the mobile body and connected to a controller of the mobile body via the positive electrode terminal, negative electrode terminal and the input/output terminal. Since the battery device for the mobile body is handled as a one-unit device in performance tests or maintenance, it can be handled easily, whilst its wiring can be simplified in structure. The battery device for the mobile body has the state of the secondary batteries and that of the battery sets monitored and controlled by the cell control unit and hence it can furnish the power in stability to improve the operational reliability.

With the battery device for the mobile body, according to the present invention, a large number of secondary batteries, a modular casing having a large number of battery housing sections each loaded with a secondary battery and a plurality of cell control units, each having the function of detecting and controlling the voltage of the sets of the secondary batteries and the function of inputting and outputting detection and control signals, are housed in an exterior casing to constitute as it were an all-in-one unit. Thus, it suffices to mount the unit on a battery loading unit of the mobile body and to connect the unit via the positive electrode terminal and the negative electrode terminal provided on the exterior casing to the mobile body. In performing performance check, the unit can be connected by itself to a testing device or dismounted from it for maintenance or other operations. Since the monitoring and control of the states of the respective secondary batteries can be performed reliably by the cell control units, the battery device for the mobile body is high in safety and reliability and can be handled extremely easily.

DESCRIPTION OF THE PREFERRED EMBODIMENTS

Figure 1:
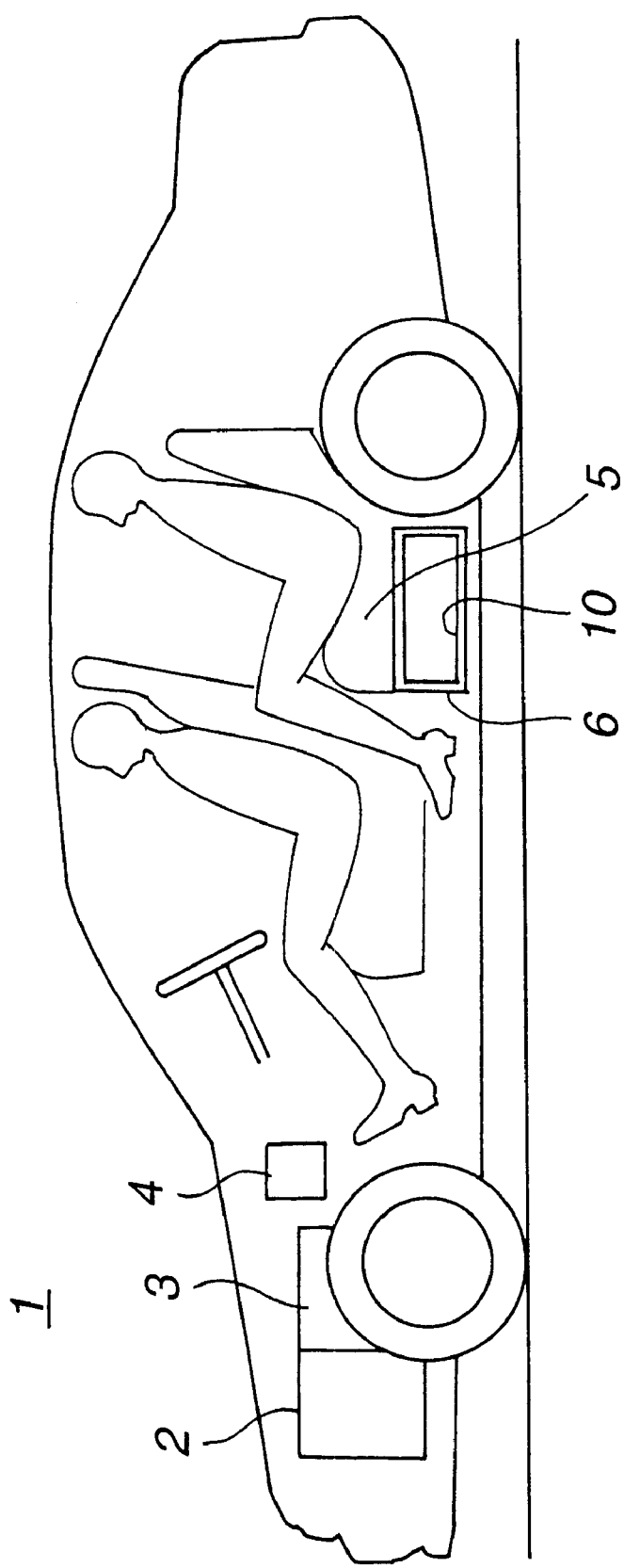
FIG. 1 illustrates the basic structure of a hybrid car loaded with a battery device embodying the present invention.

Referring to the drawings, preferred embodiments of the present invention will be explained in detail. A battery device for loading on a mobile system, referred to below simply as a battery device 10, according to a preferred embodiment of the present invention, is loaded on a hybrid car 1, and furnishes the power to a motor 3, used as a driving source in conjunction with an engine 2, as shown in FIG. 1. Although a variety of systems have been proposed for the hybrid car 1, the basic configuration is switching by a controller 4 between the engine 2 and the motor 3 to run the vehicle. In the hybrid car 1, the motor 3 is used as a driving source such as during starting or low-speed driving when:the engine efficiency is low and the engine 2 is used as a driving source during high-speed running. In the hybrid car 1, the engine 2 drives a generator, not shown, by an output of the controller 4, as necessary, to charge the battery device 10.

In the hybrid car 1, a battery loading unit 6 is provided below the floor of a rear seat 5, as shown for example in FIG. 1, and the battery device 10 is loaded on this battery loading unit 6. Thus, although the battery device 10 is affected by the radiant heat from the road surface, flooding in water during running in rainy weather, abrupt temperature changes or vibrations, sufficient reliability is assured by a structure the details of which will be explained hereinbelow.

Figure 2:
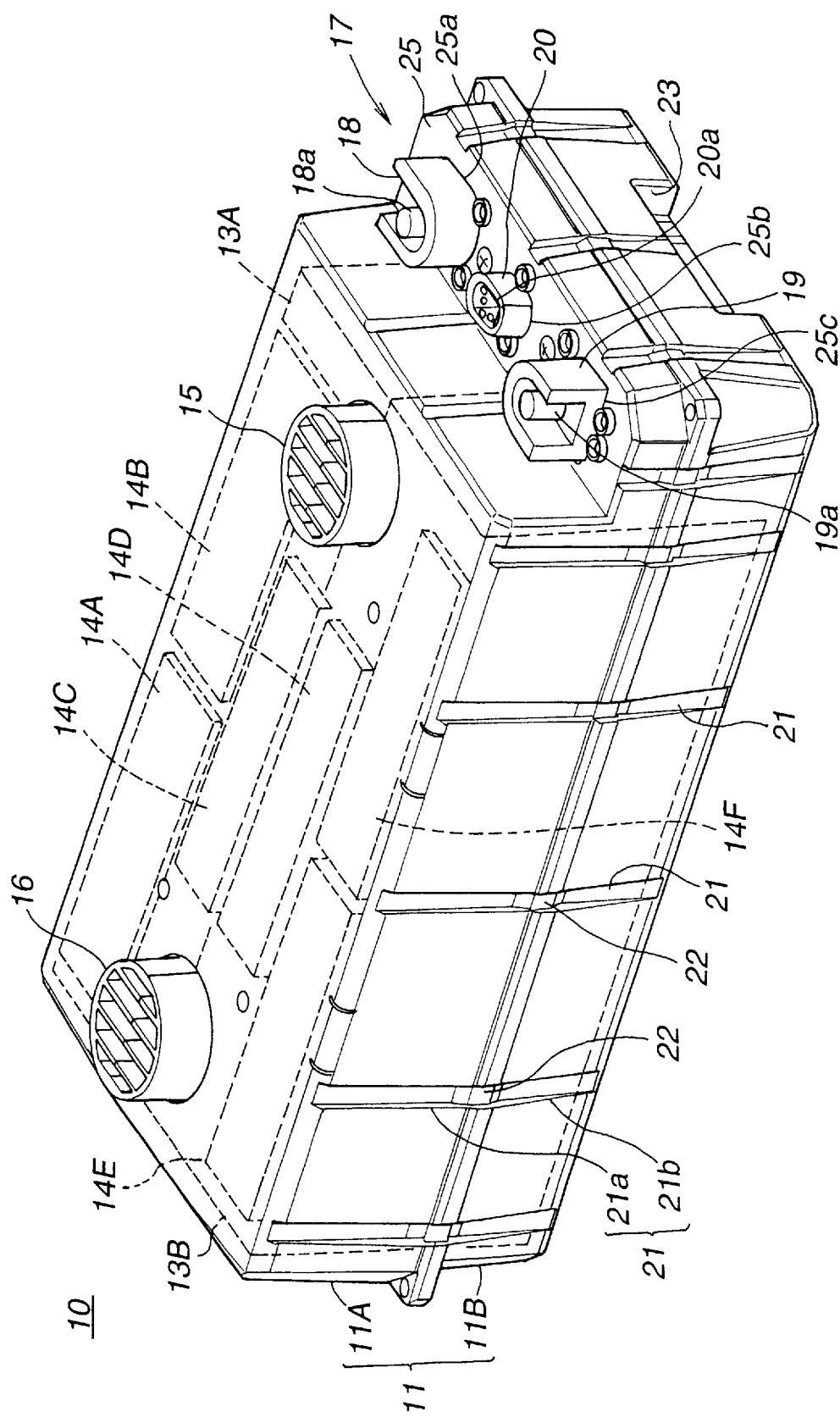
FIG. 2 is a perspective view of the battery device.

Referring to FIG. 2, the battery device 10 is comprised of a substantially box-shaped exterior casing 11, in the inside of which there are mounted, in a sealed fashion, a pair of modular casings 13A, 13B and a plurality of cell control units 14 (14A to 14F) mounted on the modular casings 13A, 13B. Within the modular casings 13A, 13B, there are accommodated a large number of lithium ion secondary batteries 12, referred to below simply as secondary batteries 12. Meanwhile, the modular casings 13A, 13B are members substantially similar to each other and which are combined together in point symmetry. Thus, the modular casings 13A, 13B are globally termed a modular casing 13, unless it is necessary to refer specifically to the respective modular casings 13A, 13B.

In the battery device 10, 24 secondary batteries 12 are loaded in each modular casing 13so that a sum total of 48 secondary batteries 12 are loaded. Two sets of battery devices 10 are loaded on the hybrid car 1, so that a sum total of 96 secondary batteries 12 are loaded on the hybrid car 1. In the battery device 10, an insulating sheet, not shown, is fused and connected to each lateral side of the modular casings 13A, 13B to maintain insulation between the modular casings 13 and between each modular casing 13 and outside.

Since the secondary batteries 12 used in the battery device 10 are lower in heat evolution, no special cooling devices are required, such that internal cooling is performed by taking air inside the vehicle into the exterior casing 11 for circulation therein. To this end, an air suction duct 15 and an air exhaust duct 16 are protuberantly formed on the upper surface of the exterior casing 11 in a longitudinally spaced apart relation, as shown in FIG. 2. The air suction duct 15 and the air exhaust duct 16 are formed as-one with the modular casing 13, as will be explained subsequently in detail. Also, in the battery device 10, a connector unit 17 is formed on a lateral side of the exterior casing 11, as shown in FIGS. 2 to 5. The connector unit 17 is provided with a positive electrode terminal 18, a negative electrode terminal 19 and a control terminal 20, which will be explained subsequently in detail.

Figure 12:
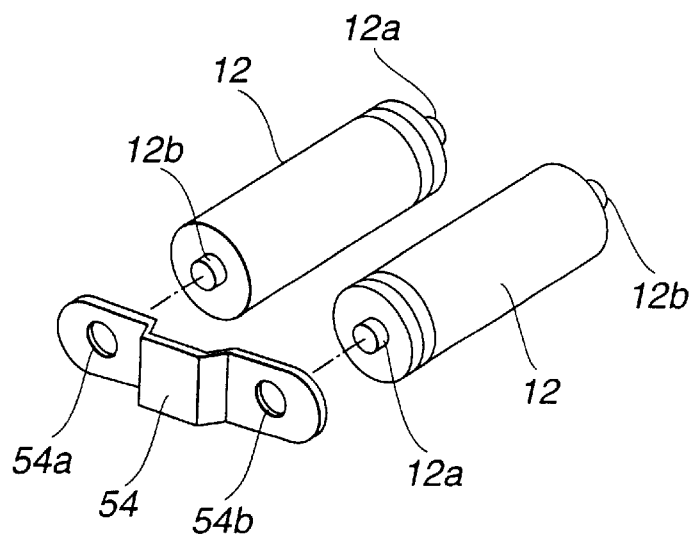
FIG. 12 illustrates a secondary battery.

Each secondary battery 12 is comprised of an elongated sheet like positive electrode material and an elongated sheet like negative electrode material, superposed together with a separator in-between and coiled in a spiral pattern to a cylindrical shape. The resulting cylindrical assembly is loaded in a battery casing charged with an electrolyte. With the secondary battery 12, a positive terminal member, connected to the positive electrode material via a gasket, is secured to one end of the battery casing, while the negative electrode material is connected to the battery casing. Referring to FIG. 12, the secondary battery 12 is shaped in a cylindrical shape, with an end and the opposite end of the secondary battery 12 operating as a positive terminal 12a and as a negative terminal 12b, respectively. The cell capacity per secondary battery 12 is 3Ah.

The exterior casing 11 is composed of an upper casing half 11 A and a lower casing half 11B, each being formed in the shape of a substantially rectangular box from a synthetic resin material superior in mechanical strength and in chemical thermal resistance against lubricating oils. The exterior casing 11 defines a hermetically sealed internal space by the upper casing half 11A and the lower casing half 11B connected to each other at abutting portions by a sealing structure, such as a structure obtained on combining crests and recesses. Of course, the exterior casing 11 is not limited to the above-described configuration. For example, it may be constituted by combining a lid-like upper casing half to a box-shaped lower casing half.

On the outer peripheral sides of the upper casing half 11A and the lower casing half 11B, there are formed aligned engagement guide grooves 21a, 21b, as shown in FIG. 2. In the assembled state of the upper and lower casing halves 11A, 11B, the engagement guide grooves 21a, 21b communicate with each other to form vertically extending engagement guide grooves 21, extending over the entire periphery of the exterior casing 11, as shown in FIG. 2. In the bottom portions of the engagement guide grooves 21 are formed engagement lugs, not shown, at the abutting portions of the upper and lower casing halves 11A, 11B.

Figure 4:
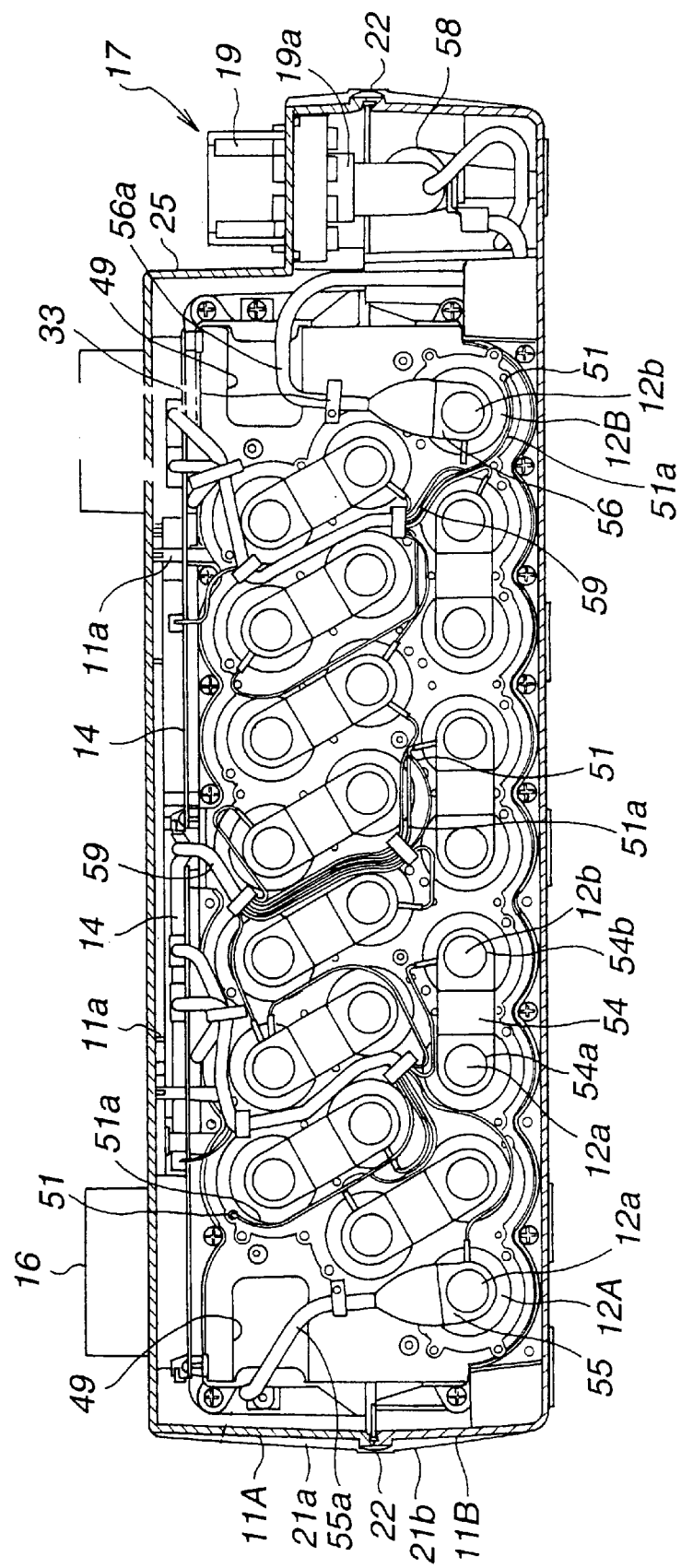
FIG. 4 is a longitudinal cross-sectional view of the battery device.

The upper and lower casing halves 11A, 11B, are combined as-one together by clinching the engagement lugs by a substantially C-shaped damper 22 of an elastic material, as the engagement lugs are engaged with each other, as shown in FIGS. 2 and 4. The exterior casing 11 is improved in mechanical strength by the outer peripheral surface of the halves 11A, 11B of the exterior casing 11 defining the engagement guide grooves 21, thus presenting irregularities.

The longitudinal end surfaces of the lower casing half 11B are formed with recesses 23 extending to its bottom surface. These recesses 23 serve as a support for a hand of a user carrying the battery device 10, while also serving as as positioning means when loading the battery device 10 on the battery loading unit 6 of the hybrid car 1.

Figure 3:
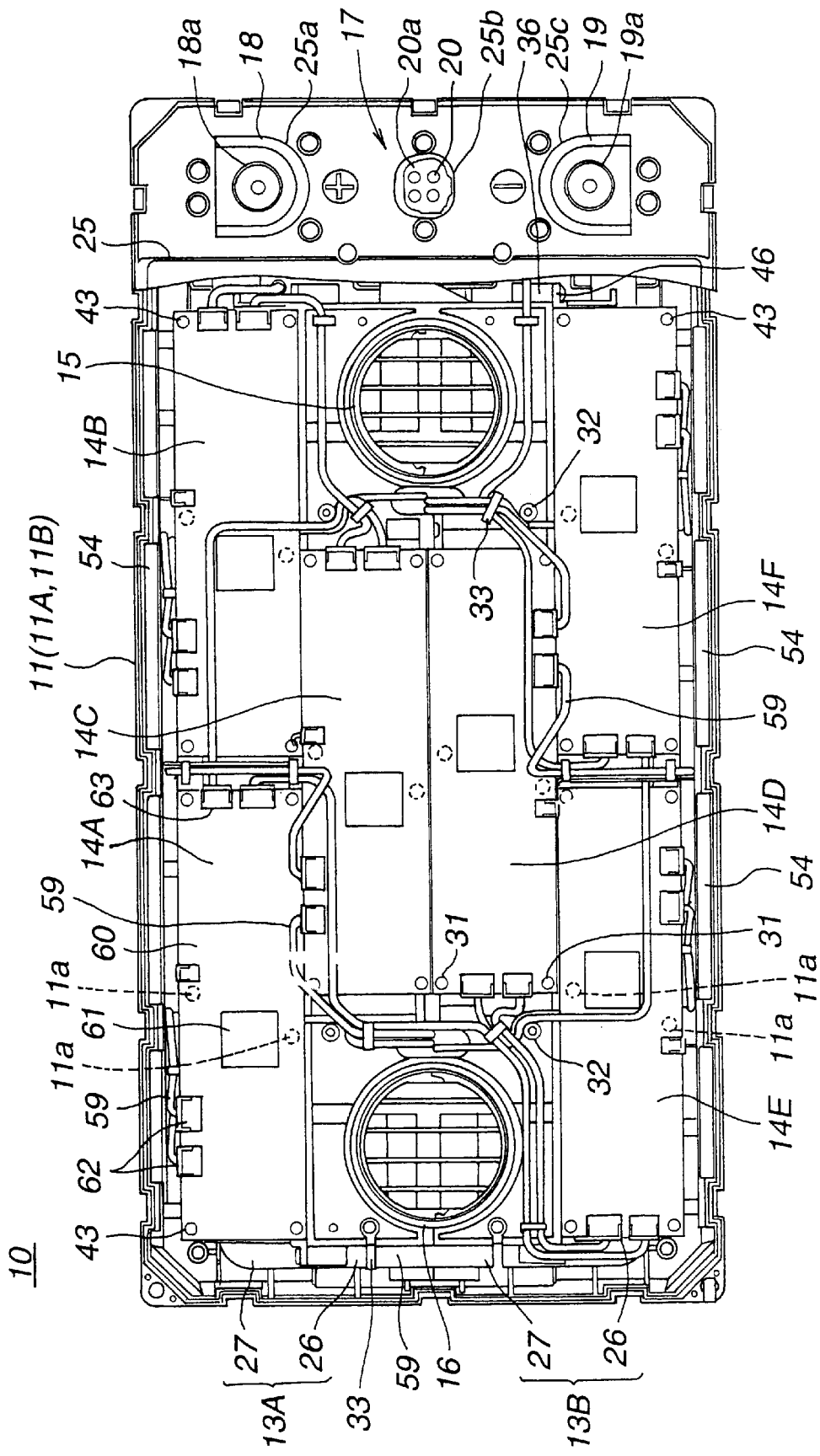
FIG. 3 is a plan view showing the battery device with an upper casing half on an outer casing removed.
Figure 5:
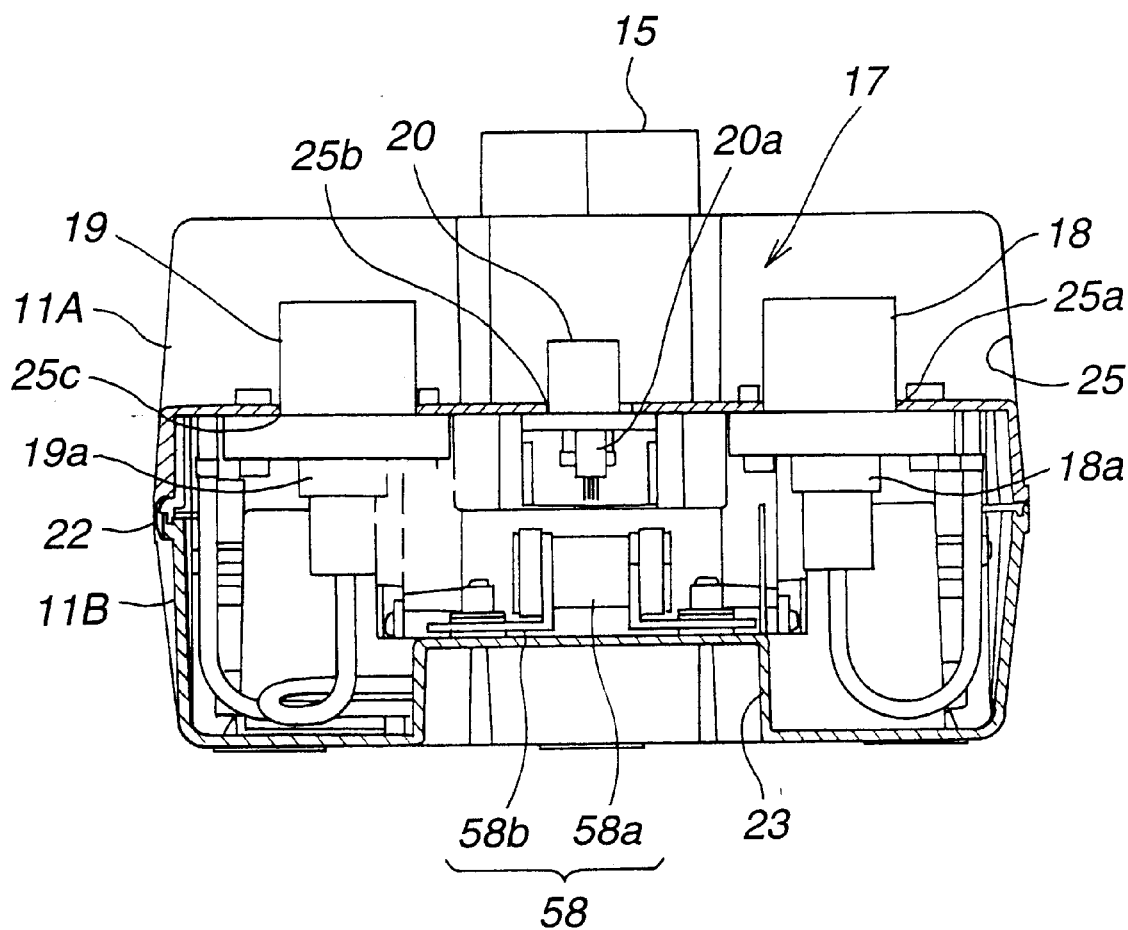
FIG. 5 is a longitudinal cross-sectional view of a connecting portion of the battery device.

On a longitudinal end on the upper casing half 11A is formed a step 25 on which to form the connector unit 17, as shown in FIGS. 2 to 5. In this step 25 are formed first to third terminal holes 25a to 25c, arranged side-by-side in the width-wise direction, as shown in FIGS. 3 to 5. In the first terminal hole 25a is mounted a terminal member 18a, constituting the positive electrode terminal 18, in a sealed fashion. In the centrally arranged second terminal hole 25b is mounted a connector member 20a, constituting a transmission/reception terminal 20 for transmitting or receiving control signals, in a sealed fashion. In the third connecting hole 25c is mounted a terminal member 19a constituting the negative electrode terminal 19, similarly in a sealed fashion.

On an inner side of the upper surface of the upper casing half 11A are formed a large number of thrusting pins 11a adapted to thrust the major surface of the cell control unit 14, as shown in FIGS. 3 and 4. These thrusting pins 11a are adapted to face both lateral sides of the cell control units 14, mounted in the modular casing 13 as later explained, and are adapted to thrust them in non-symmetrical positions, as shown in FIG. 3. By this configuration, the thrusting pins 11a suppress resonant vibrations of the cell control units 14 due to vibrations applied to the battery device 10.

Figure 6:
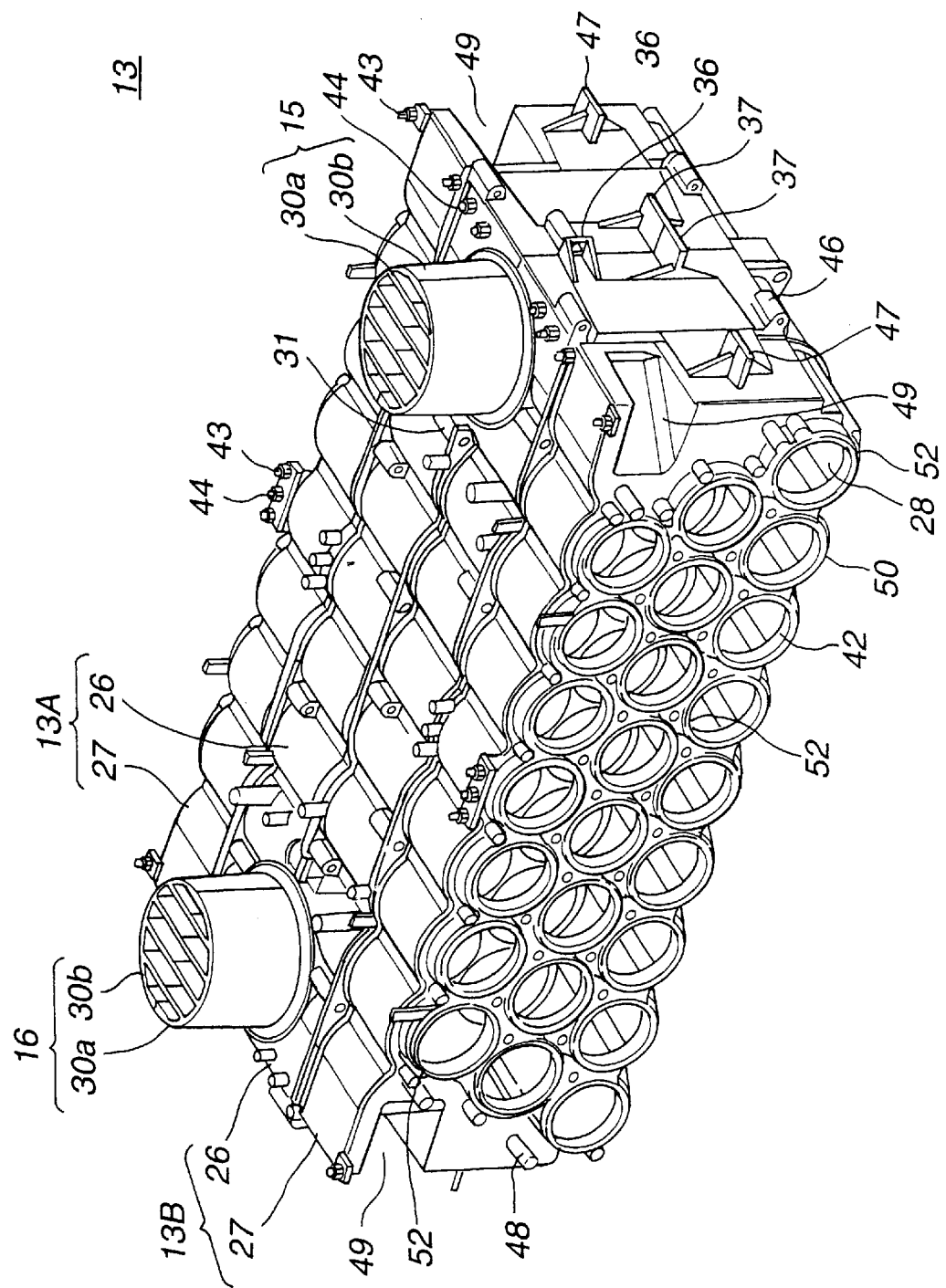
FIG. 6 is a perspective view for illustrating a modular casing housed in the outer casing of the battery device.

In the exterior casing 11, constructed as described above, there is accommodated the modular casing 13. This modular casing 13 is made up of a pair of modular casings 13A, 13B, assembled together by being overlapped in a side-by-side relation, as shown in FIG. 6. The modular casing 13 is moulded from a synthetic resin material having mechanical strength, thermal resistance and resistance against chemical, such as a polybutylene terephthalate resin. Among other resin materials, usable for molding the modular casing 13, there are, for example, an acrylonitrile butadiene styrene resin, a polyamide resin, a polypropylene resin and a polycarbonate resin.

Figure 7:
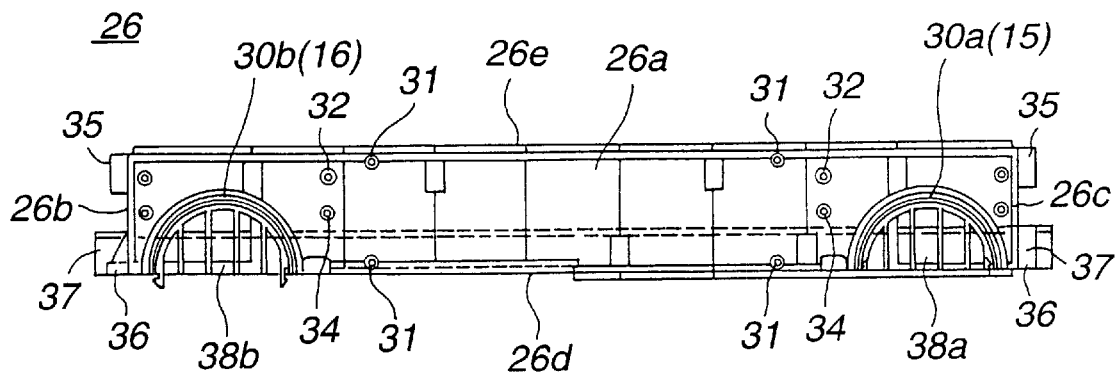
FIG. 7 is a plan view of an inner casing member constituting the modular casing.
Figure 8:
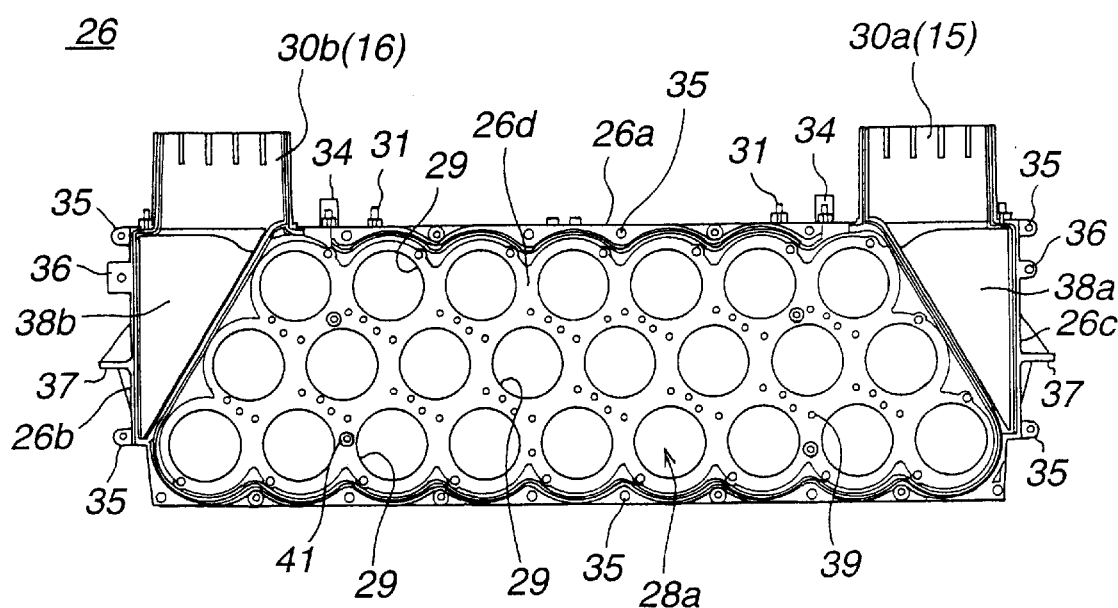
FIG. 8 is a front view of an inner casing member constituting the modular casing.
Figure 9:
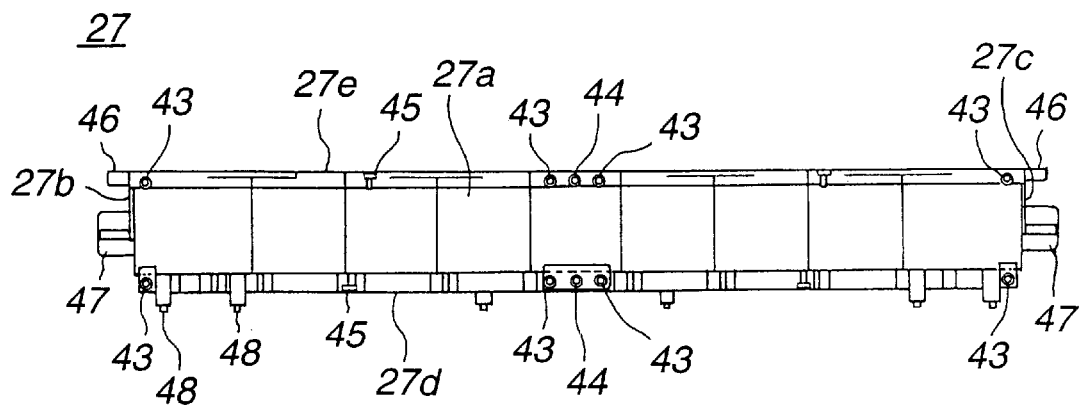
FIG. 9 is a plan view of an outer casing member constituting the modular casing.
Figure 10:
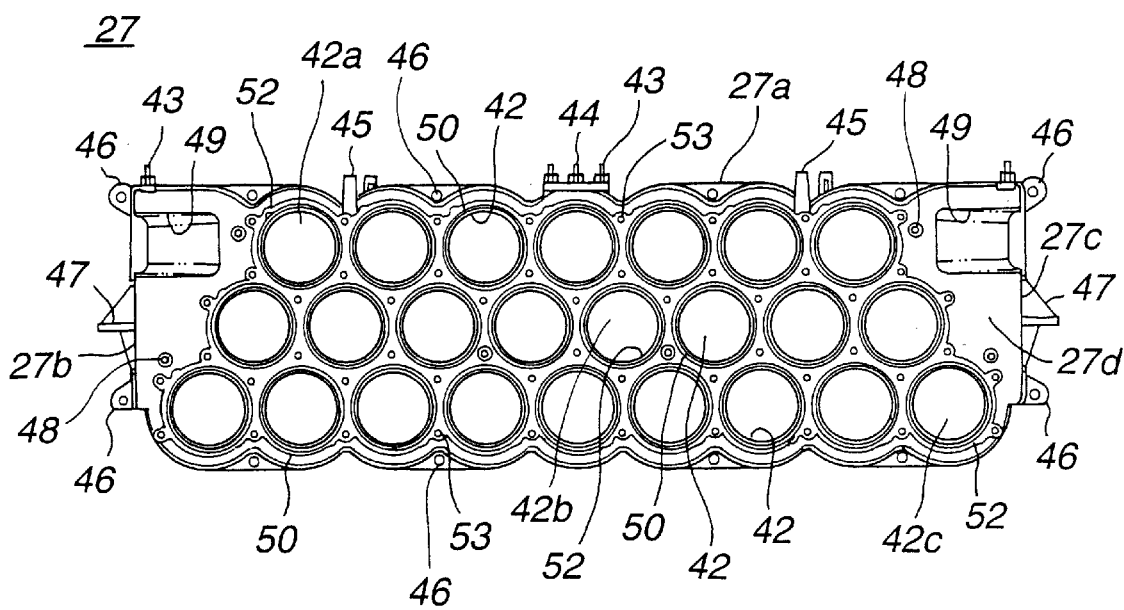
FIG. 10 is a front view of an outer casing member constituting the modular casing.

The modular casing 13 is constituted by combining two casing members, namely an inner casing member 26, shown in FIGS. 7 and 8, and an outer casing member 27, shown in FIGS. 9 and 10. The inner casing member 26 and the outer casing member 27 are molded in substantially rectangular box shape opened on the facing lateral sides thereof, with the size and the shape of the rectangles being similar to each other. The inner casing member 26 and the outer casing member 27 are combined together int the width-wise direction with the opened lateral sides as junction surfaces to constitute a substantially rectangular box-shaped modular casing 13.

The modular casing 13, constituted by combining the two modular casings 13A, 13B in the width-wise direction, as shown in FIG. 6, is of substantially the equal shape and size as the inner spacing of the exterior casing 11. When the modular casing 13 is constituted by combining the inner casing member 26 and the outer casing member 27, as will be explained in detail subsequently, there is defined in the modular casing 13 a battery housing 28 for housing secondary batteries 12 therein. The battery housing 28 communicates with 24 terminal openings 29, formed in a lateral side 26d of the inner casing member 26, and 24 terminal openings 42 formed in a lateral side 27d of the outer casing member 27. The modular casing 13 is formed to a widthwise size sufficient to permit the positive terminal 12a and the negative terminal 12b of each secondary battery 12 to be exposed to outside via the respective terminal openings 29, 42. The secondary batteries 12 are introduced into the inside of the battery housing 28 from the opened lateral sides 26e of the inner casing member 26 or from the opened lateral sides 27e of the outer casing member 27.

In the battery housing sections 28 are arranged secondary batteries 12 in a vertically staggered relation in three tiers so that plural secondary batteries 12 are arranged in one horizontal plane. In an upper tier in the battery housing 28, 7 secondary batteries 12U are accommodated in diametrically arranged positions relative to one another. In a mid tier in the battery housing 28, 8 secondary batteries 12C are accommodated in diametrically arranged positions relative to one another, whereas, in a lower tier in the battery housing 28, 9 secondary batteries 12U are accommodated in diametrically arranged positions relative to one another. In the battery housing 28, the secondary batteries 12C of the mid tier are housed with a shift of one-half the battery radius laterally with respect to the secondary batteries 12U of the upper tier, whilst the secondary batteries 12L o the lower tier are housed with a shift of one-half the battery radius laterally with respect to the secondary batteries 12C of the mid tier.

Thus, in the battery housing 28, the secondary batteries 12, housed in the upper and lower tiers, are arranged in the same vertical positions, so that 24 secondary batteries 12 are arrayed in the overall trapezoidal area in a staggered relation in the upper, mid and lower tiers. By designing the battery housing 28 of the modular casing 13 in this manner, the internal spatial efficiency is improved, while the flow of external air taken at an air intake duct 15 so as to be discharged at an air exhaust duct 16 is maintained to cool the secondary batteries 12 efficiently.

As for the inner casing member 26, the lateral side 26d, having the terminal openings 29 arrayed in a staggered relation, constitutes a junction surface with respect to the inner casing member 26 constituting the other modular casing 11. Each terminal opening 29 is of a diameter slightly smaller than the outer diameter of the secondary battery 12 so that the end face of the secondary battery 12 loaded in the battery casing 28 is retained by each peripheral wall of the opening to expose only the positive terminal 12a or the negative terminal 12b to outside.

An upper surface 26a of the inner casing member 26 is formed as-one with semi-cylindrical duct halves 30a, 30b in a longitudinally spaced relation to each other, for constituting the air intake duct 15 and the air exhaust duct 16. The upper surface 26a of the inner casing member 26 is also formed as-one with plural mounting studs 31 for securing four corners of the cell control unit 14 which will be explained subsequently. Each mounting stud 31 is constituted by a stepped protuberance made up of a cruciform base portion 31a and a fitting fusing portion 31b of a reduced diameter, as will be explained subsequently in detail. On the lateral sides 26a of the inner casing member 26 are formed wiring guide projections 32 for guiding a cell set sensing cord 59 and damper mounting portions 34 for mounting cord dampers 33.

On each lateral side of the inner casing member 26 are formed plural connecting projections 35, 36 for connection to the opposite outer casing member 27 or the inner casing member 26 of the other modular casing 13 and a flange 37 adapted for being set or positioned with respect to the holding studs formed on the inner surface of the exterior casing 11. Referring to FIG. 8, the inner casing member 26 is formed with duct spacing areas 38a, 38b in communication with the lower sides of the duct halves 30a, 30b, as shown in FIG. 8. The duct spacing areas 38a, 38b are of a cross-sectional shape of a downwardly directed right triangle.

The lateral side 26d of the inner casing member 26, shown in FIG. 8, constitutes a junction surface with respect to the inner casing member 26 of the other modular casing 13, as explained previously. With the inner casing member 26, the peripheral portions of the duct halves 30, duct spacing areas 38 or the terminal openings 29 constitute abutment portions with respect to the corresponding portions of the lateral side 26d of the opposite inner casing member 26. The inner casing members 26 are tightly connected to each other by the fitting of projections and recesses on the abutting portions. The two inner casing members 26 are formed similarly to each other except that the two are rotated 180° relative to each other, and are combined together with the lateral sides 26 as the junction surfaces.

The lateral side 26d of the inner casing member 26 is formed with a large number of damper mounting portions 39 on the outer periphery of each terminal opening 29. These damper mounting portions 39 operate for mounting the adapter members holding the exchanged secondary batteries 12 in the modular casing 13 on exchanging the secondary batteries 12. The inner casing member 26 is formed as-one with insulating sheet mounting studs 41. The inner casing member 26 is assembled by having an outer edge of the opened lateral side 26e abutted against the outer casing member 27.

On the lateral side 27d of the outer casing member 27, constituting the outer lateral side of the modular casing 13, the above-mentioned 24 terminal openings 42 are arranged in a staggered relation. The terminal openings 42 are of inside diameters slightly smaller than the outside diameter of the secondary batteries 12, so that the secondary batteries 12 loaded in the battery housing 28 are retained by the peripheral wall of the openings to permit only the positive terminal 12a or the negative terminal 12b to be exposed to outside.

The upper surface 27a of the outer casing member 27 is also formed as-one with plural mounting studs 43 for securing four corners of the cell control unit 14 which will be explained subsequently. Similarly to the mounting stud 31 of the inner casing member 26, each mounting stud 43 is constituted by a stepped column made up of a cruciform base portion 43a and a fitting fusing portion 43b of a reduced diameter, as will be explained subsequently in detail. On the lateral sides 27a of the outer casing member 27 are formed clamping mounting portions 44 for mounting the cord dampers 33 and cord engagement portions 45.

On each lateral side of the outer casing member 27 are formed plural connection projections 46 for connection to the opposite side inner casing member 26 and a flange 47 for setting and positioning with respect to the holding stud formed on the inner surface of the exterior casing 11. The outer casing member 27 has the rim of the opened lateral side 27e abutted against the rim of the opened lateral side 26e of the inner casing member 26. By these abutting portions of the inner casing member 26 and the outer casing member 27 being constituted by the interengaged projections and recesses, the inner casing member 26 and the outer casing member 27 have the coupling states fixed positively even under application of disturbances, such as vibrations.

Referring to FIG. 10, there are formed upright on the outer casing member 27 a plurality of insulating sheet mounting studs 48 for fusingly securing an insulating sheet, not shown. In a lateral side 27d of the outer casing member 27, there are formed a number of recesses 49, at a higher position, for opening in longitudinal lateral sides 27b, 27c. These recesses 49 perform the role of providing an air stream in the modular casing 13, while operating as a hand support and as wiring guides for wiring cords 55a, 56a, as shown in FIG. 4.

On outer peripheral sides of the terminal openings 42 opened in the lateral sides 27d of the outer casing member 27 are formed annular recesses 50. These annular recesses 50 operate as slicing guides in slicing the opening edges of the terminal openings 42 to take out the secondary batteries 12 from the modular casing 13 in case of malfunctioning of the secondary batteries 12. In the outer casing member 27, there are formed a number of sensor openings 52, in which to load temperature sensors 51 (see FIG. 4), in register with pre-set terminal openings 42. Specifically, the sensor openings 52 are provided in register with the first terminal opening 42a in the upper tier, a fifth terminal opening 42b of the mid tier and with the ninth terminal opening 42c of the lower tier. The temperature sensors 51 are connected via temperature sensor sensing cords 51a to the cell control unit 14, as shown in FIG. 4.

On the lateral side 27d of the outer casing member 27, there are formed a large number of damper mounting portions 53 around the terminal openings 42. Similarly to the damper mounting portions 39 of the inner casing member 26, the damper mounting portions 53 operate for mounting an adapter member for holding secondary batteries 12 on the modular casing 13 on exchanging the secondary batteries 12.

With the above-mentioned structure of the inner casing member 26 and outer casing member 27, the outer edges of the facing junction sides 26e, 27e are abutted against each other along the entire periphery, whilst the connecting projections 35 and recesses 46 are engaged with one another. The inner casing member 26 and the outer casing member 27 are combined with each other as these are superposed together along the thickness direction. The ducts 30a, 30b, required to be of shielding properties, are bonded to each other with e.g., a urethane-based adhesive. The combined portions are secure together using set screws to complete the modular casings 13A, 13B. In the assembled state of the inner casing member 26 and the outer casing member 27 to complete the modular casing 13, the terminal openings 29, 42 are aligned with each other.

The modular casings 13A, 13B are bonded together with the lateral sides 26d, 26d of the facing inner casing members 26 operating as junction surfaces. The modular casings 13A, 13B are combined together as-one to complete the modular casing 13 by set screws screwed in tapped holes, not shown, in the connection projections 36, 36, abutted to each other, to complete the modular casing 13.

In the assembled state of the modular casings 13A, 13B of the modular casing 13, the duct halves 30a and the opposite side duct halves 30b are abutted to each other to constitute the cylindrical air intake duct 15. Also, in the assembled state of the modular casings 13A, 13B of the modular casing 13, the duct halves 30b and the opposite side duct halves 30a are abutted to each other to constitute the cylindrical air exhaust duct 16. With the modular casing 13 housed in the exterior casing 11, the air intake duct 15 and the air exhaust duct 16 are protruded from the upper surface of the exterior casing 11.

Figure 11:
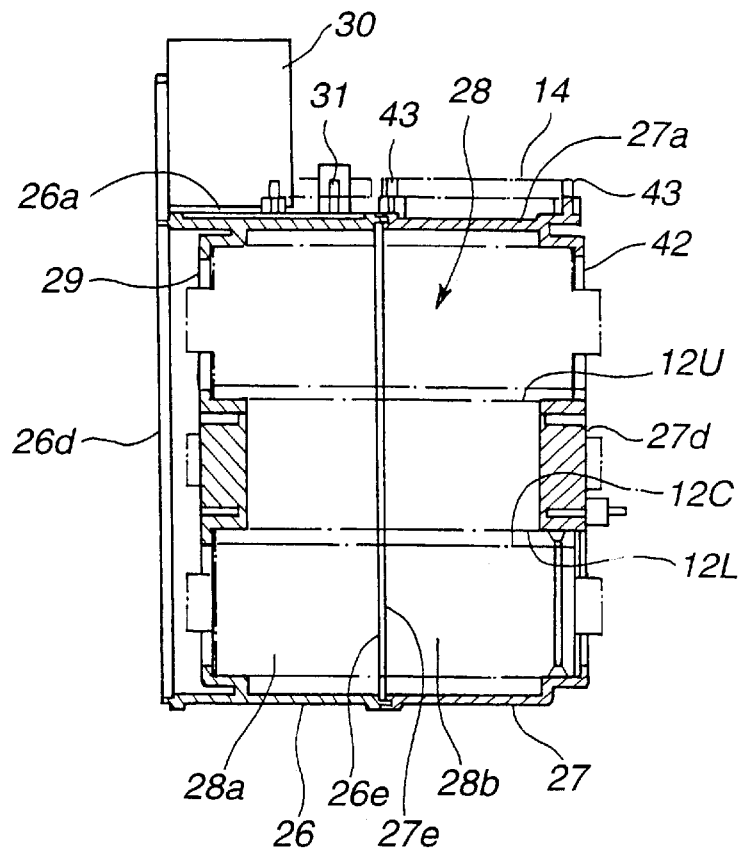
FIG. 11 is a longitudinal cross-sectional view for illustrating the state of housing the secondary battery in the modular casing.

In the modular casing 13, the secondary batteries 12 are housed into the battery housing 28 from the opened lateral sides of the inner casing member 26 or the outer casing member 27. Since the secondary batteries 12 have the outside diameters slightly larger than the inside diameters of the terminal openings 29, 42, the secondary batteries have both ends retained by the inner peripheral wall sections of the terminal openings 29, 42 so as to be held in this state in the battery housing 28, as indicated by a chained line in FIG. 11. Thus, with the secondary batteries 12, the positive terminal 12a and the negative terminal 12b are exposed to outside via the terminal openings 29, 42. Also, the secondary batteries 12 are housed in the battery housing 28 as the positive terminal 12a and the negative terminal 12b are arranged in a relatively staggered positions, as shown in FIG. 12.

In the modular casing 13, an adhesive is charged to a space around the respective secondary batteries 12, housed in the battery housing 28, via adhesive charging holes bored in the inner casing member 26 and in the outer casing member 27, for tightly securing the secondary batteries 12 to the inner periphery of the terminal openings 29, 42. As the adhesive, a synthetic resin adhesive, such as urethane yarn, silicon yarn or the modified silicon yarn.

In the battery device 10, 48 secondary batteries 12 are housed in the respective modular casings 13 as described above, these secondary batteries 12 are connected in series. That is, each secondary battery 12 is housed in such a manner that, in the lateral side 27d of the outer casing member 27, which proves the outer lateral side of the modular casing 13, and in the opened lateral side 26e of the inner casing member 26, which proves a junction surface between the modular casings 13, the positive terminal 12a and the negative terminal 12b are alternately exposed in the vertically and horizontally neighboring terminal openings 42. The positive terminal 12a and the negative terminal 12b of each secondary battery 12, exposed from the terminal openings 29, 42, are electrically connected to each other by a connecting plate member 54, as shown in FIG. 4.

The connecting plate member 54 is comprised of, for example, a rectangular copper plate, warped in cross-section to substantially a crank shape, and plated e.g., with nickel. In both sides of the connecting plate member 54 are bored fitting holes 54a, 54b, into which to fit the positive terminal 12a or the negative terminal 12b of the secondary battery 12, as shown in FIG. 12. In these fitting holes 54a, 54b, the positive terminal 12a or the negative terminal 12b is fitted and spot-welded to interconnect the secondary batteries 12 in series with each other.

In the battery device 10, the first secondary battery 12A and the ninth secondary battery 12B of the lower tier prove secondary batteries, connected at both extreme ends of the set of 24 secondary batteries 12, in turn connected in series with one another, as shown in FIG. 4. To the first secondary battery 12A and to the ninth secondary battery 12B are connected wedge-shaped connection plate members 55, 56, as shown in FIG. 4. In the battery device 10, the first secondary battery 12A has its positive terminal 12a exposed via the terminal opening 42, while the ninth secondary battery 12B has its negative terminal 12b exposed via the terminal opening 42.

In the battery device 10, the modular casings 13A, 13B are combined together to constitute the modular casing 13, by having the ninth secondary battery 12B of one of the modular casings 13A, 13B positioned facing the first secondary battery 12A of the other of the modular casings 13A, 13B. In the battery device 10, the wiring cord 55a, connected to the connection plate member 55 of the first secondary battery 12A, is led out to a lateral side of the modular casing 13 in the battery device 10, a wiring cord 56a via the recess 49, connected to as shown in FIG. 4.

In the battery device 10, the wiring cord 56a, connected to the connection plate member 56 of the ninth secondary battery 12B, is led to the terminal 17 of the modular casing 13 via the recess 49. The wiring cord 56a is connected in the terminal 17 to a fuse device 58 and thence to a negative electrode terminal member 19a, as shown in FIG. 4. Meanwhile, the ninth secondary battery 12B is the 48th secondary battery 12B of the entire battery device 10.

The fuse device 58 is made up of a fuse 58a and a fuse holder 58b, as shown in FIGS. 4 and 5. The fuse holder 58b is secured to the upper surface of the hand support recess 23 on the step 25 of the exterior casing 11. In the battery device 10, the fuse device 58 is provided between the 48th secondary battery 12B and the negative electrode terminal member 19a to assure safety against possible occurrence of excess current.

In the battery device 10, the cell set sensing cord 59 (sensing code 59) is connected to each of the connecting plate members 54 of the interconnecting the respective secondary batteries 12, as shown in FIGS. 2 and 3. The sensing cord 59, used for detecting the voltage of each secondary battery 12, is formed by, for example, a twisted copper wire having an insulating coating, and is held by the cord damper 33 mounted on the damper mounting portion 44, as shown in FIGS. 2 and 3. The sensing cord 59 is also guided along the wiring guide projection 32 to the associated cell control unit 14. In the battery device 10, connection and routing of the sensing cord 59 on the inner casing member 26 is the same as that described above.

After the connection and routing of the secondary batteries 12 and the sensing cord 59, the modular casings 13A, 13B of the battery device 10 are put together, as described above.

In the battery device 10, the 48 secondary batteries 12, accommodated in the battery housing 28 of the modular casing 13 and connected in series with one another, make up cell modules with 8 secondary batteries as sets. The battery device 10 is provided with six cell control units 14A to 14F for detecting the voltage or temperature, and for inputting/outputting the detection or control signals, each for the cell module and its set of eight secondary batteries 12. In the battery device 10, these six cell control units 14 are mounted on the upper surface of the modular casing 13.

Figure 13:
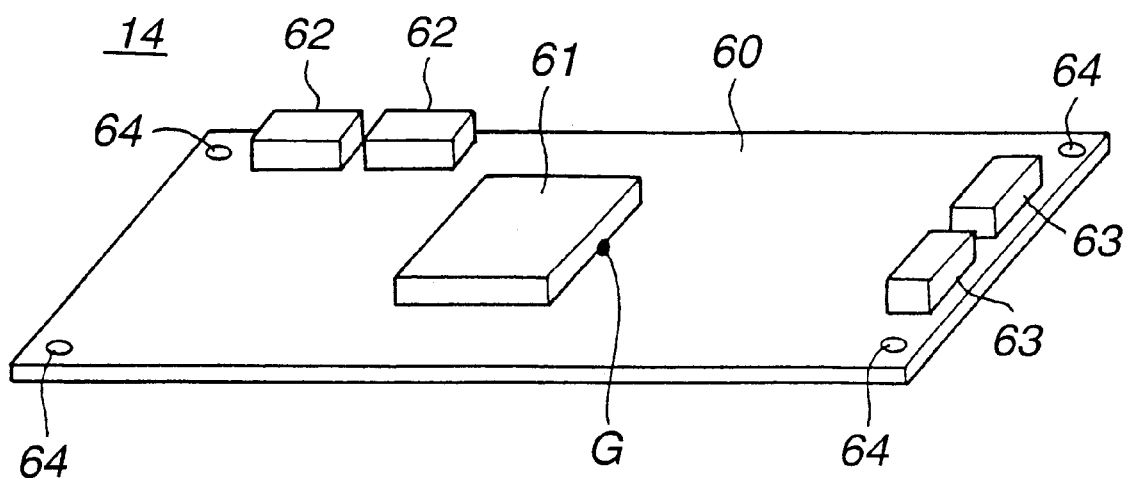
FIG. 13 is a perspective view showing the schematic structure of a cell controller provided on the battery device.

Each cell control unit 14 includes a rectangular circuit board 60 carrying a suitable circuit pattern, not shown, thereon, a micro-processor 61, loaded on this circuit board 60, along with circuit elements or electronic components, not shown, plural sensing connectors 62 and an input/output connector 63, as shown in FIG. 13. In each cell control unit 14, the circuit board 60 is approximately equal in width to and approximately one-half in length of the inner casing member 26 or the outer casing member 27 of the modular casing 13.

The circuit board 60 has elongated mounting holes 64, as later explained, at its four corners, with these mounting holes 64 being in register with the mounting studs 31 of the inner casing member 26 or with the mounting studs 43 of the outer casing member 27. On the circuit board 60, a micro-processor 61 of a larger size and weight is loaded at a position offset with respect to the position of the center of gravity G thereof. To the cell control unit 14 is also connected a connection cord connected in turn to the transmission/reception terminal member 20a.

The first to third cell control units 14A to 14C are mounted on the modular casing 13A, as shown in FIGS. 2 and 3. The fourth to sixth cell control units 14D to 14F are mounted on the other modular casing 13B. Specifically, the first and second cell control units 14A, 14B are mounted on the upper surface 27a of the outer casing member 27 constituting the modular casing 13A in a longitudinally arrayed relation to one another. The third cell control unit 14C is mounted between the duct halves 30 on the upper surface 26a of the inner casing member 26 constituting the modular casing 13A. The fourth cell control unit 14D is mounted on the upper surface 26a of the inner casing member 26 constituting the other modular casing 13B. The fifth and sixth cell control units 14E, 14F are mounted on the upper surface 27a of the outer casing member 27 constituting the other modular casing 13B in a longitudinally arrayed relation to one another.

Each cell control unit 12 is set on the mounting stud 31 formed on the upper surface 26a of the inner casing member 26, or on the upper surface 27a of the outer casing member 27, and mounted on the modular casing 13 on heat fusing in situ.

Meanwhile, since the battery device 10 is mounted on the hybrid car 1, it is subjected to considerable mechanical load, such as severe vibrations, as well as to a wide range of temperature and humidity loads. Thus, in the battery device 10, the inner casing member 26 (outer casing member 27) is molded from a synthetic resin material with a thermal expansion coefficient of 50 ppm/° C., with the spacing between the mounting studs 31 (43) in the longitudinal direction of 200 mm, whilst the circuit board 60 of the cell control unit 14 is molded from a synthetic resin material with a thermal expansion coefficient of 13 ppm/° C. In the battery device 10, the mounting stud 31 and the mounting hole 64, registering with each other at 25° C. under these specifications, undergo dimensional deviation of approximately 0.74 mm and approximately 0.48 mm at 125° C. nd at −40° C., respectively.

In the battery device 10, if each cell control unit 14 is fixedly secured to the mounting stud 31 by set screws or with an adhesive, significant mechanical loads are applied to the mounting stud 31 or to the circuit board 60 due to the dimensional deviation caused by changes in the temperature conditions. In the battery device 10, there is a risk of cracks being generated by these mechanical loads on the screw holes of the mounting studs 31 or of warping or tension generated in the circuit board 60. This tends to produce cracks in the soldering or circuit patterns of mounted components on the circuit board 60, thus possibly leading to destruction of these components.

Figure 16:
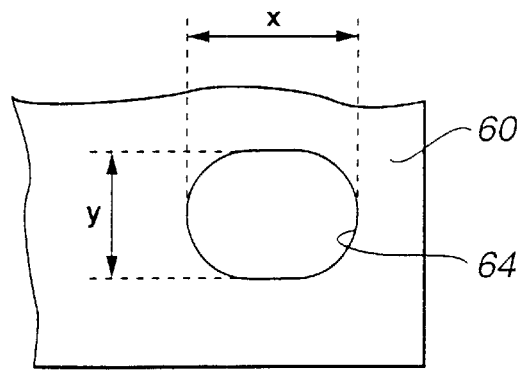
FIG. 16 is a plan view for illustrating a mounting opening bored in a circuit board of the cell controller.

In the battery device 10, the mounting holes 64 in the circuit board 60 are formed as elongated holes, or the mounting stud 31 is made up of the cruciform base portion 31a (43a) and a shaft-like fitting fusing portion 31b(43b), in order to suppress the aforementioned problem. The mounting hole 64 of the circuit board 60 has its long axis along its longitudinal direction, as shown in FIG. 16. The circuit board 60 has the optimized long axis diameter x and the optimized short axis diameter y of the mounting hole 64. The mounting hole 64 has its short axis diameter smaller than the outside diameter of the base portion 31a of the mounting stud 31 and slightly larger than the outside diameter of the fitting fusing portion 31b.

Figure 14:
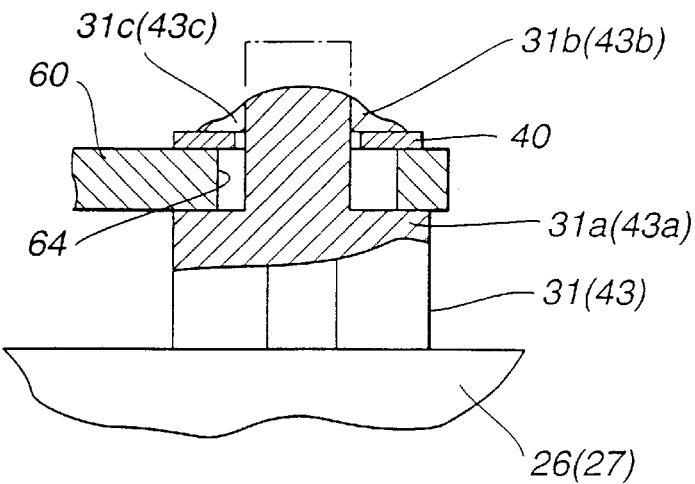
FIG. 14 is a side view showing essential portions of the structure of a mounting portion of mounting the cell controller to the modular casing.
Figure 15:
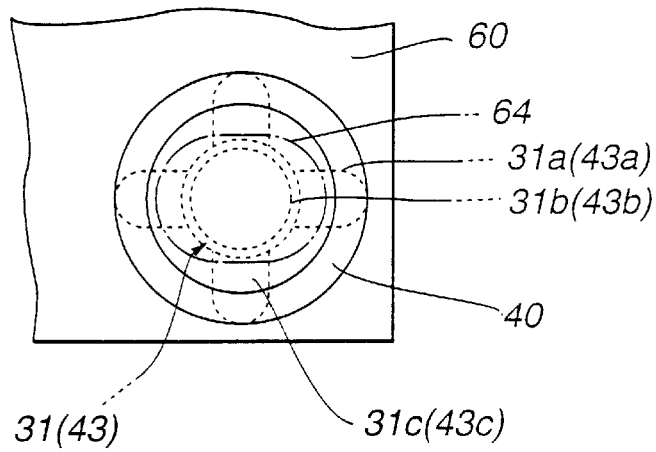
FIG. 15 is a plan view thereof.

The circuit board 60 has its bottom supported on the base portion 31a, by the fitting fusing portion 31b being passed through the mounting hole 64, and is set in tis state on the mounting stud 31. A washer 40 is mounted on the fitting fusing portion 31b from the side of the circuit board 60. The washer 40 has its outside diameter longer than the long axis diameter of the mounting hole 64, as shown in FIGS. 14 and 15. In this state, the fitting fusing portion 31b has its distal end 31c (43c) fused, as shown in FIGS. 14 and 15. Thus, the circuit board 60 is held on the mounting stud 31 by having the rim of the mounting hole 64 clinched between the base portion 31a and the washer 40. The circuit board 60 is movable within the extent of the difference between the long axis diameter x of the mounting hole 64 and the outside diameter of the fitting fusing portion 31b to absorb the dimensional deviation caused by changes in the temperature conditions as described above.

An optimum range of the long axis diameter x of the mounting hole 64 can be found by, for example, the following equation: If an optimum value of the mounting hole 64 and the mounting stud 31 which imposes no mechanical load on the circuit board 60 for a temperature change from the standard temperature of t0 up to a maximum temperature of t1 is $\chi 1$ and if an optimum value of the mounting hole 64 and the mounting stud 31 which imposes no mechanical load on the circuit board 60 for a temperature change from the standard temperature of t0 up to a maximum temperature of t2 is $\chi 2$, it is sufficient if an optimum value $\chi$ of the mounting hole 64 and the mounting stud 31 is such that $\chi \geq \chi 1 + \chi 2$.

If the thermal expansion coefficient of the circuit board 60 is $\tau 1$ (ppm/° C.), the thermal expansion coefficient of the modular casing 13 is $\tau 2$ (ppm/° C.), the gap between the mounting studs 31 is A±α mm and the outside diameter of the g31b is R±γ mm, it suffices if the optimum value $\chi 1$ of the maximum temperature t1 satisfies an equation:

$$\chi 1 = (\tau 2 - \tau 1) \times (t2 - t1) \times (A \pm \alpha) + (R \pm \gamma))/2.$$

Similarly, it suffices if the optimum value $\chi 2$ of the maximum temperature t2 satisfies an equation:

$$\chi 2 = (\tau 2 - \tau 1) \times (t2 - t1) \times (A \pm \alpha) + (R \pm \gamma)).$$

Therefore, it is sufficient if the optimum value $\chi$ for the mounting hole 64 and the mounting stud 31 meets the following condition:

$$\chi \geq (\tau 2 - \tau 1) \times (t2 - t1) \times (A \pm \alpha) + (R \pm \gamma)) \chi \geq 1 + \chi 1.$$

Meanwhile, the micro-processor 61 or other circuit elements, liable to generate more or less heat, are loaded on the circuit board 60 of each cell control unit 14. Each cell control unit 14 is mounted via the mounting studs 31, 43 on the modular casing 13. Specifically, the circuit board 60 of each cell control unit 14 is set on the base portions 31a, 43a of the mounting studs 31, 43. Therefore, in each cell control unit 14, a gap is defined between the upper surfaces 26a, 27a of the modular casing 13. Via this gap, the flow path for the cooling air, taken from the air intake duct 15, is assured to realize efficient cooling.

Each cell control unit 14 is mounted on the upper surface of the modular casing 13 and, with the modular casing 13, carrying the cell control unit, being accommodated in the exterior casing 11, is thrust by a retainer pin 11a of the exterior casing 11. Each cell control unit 14 has its non-symmetrical portions along its lateral side thrust by the retainer pin 11a. Therefore, each cell control unit 14 is suppressed from resonant vibrations by the oscillations applied to the battery device 10, by the structure concerning the loading position of the micro-processor 61 on the circuit board 60 and the trusting position of the circuit board 60 by the retainer pin 11a, to assure strong mounting.

Figure 17:
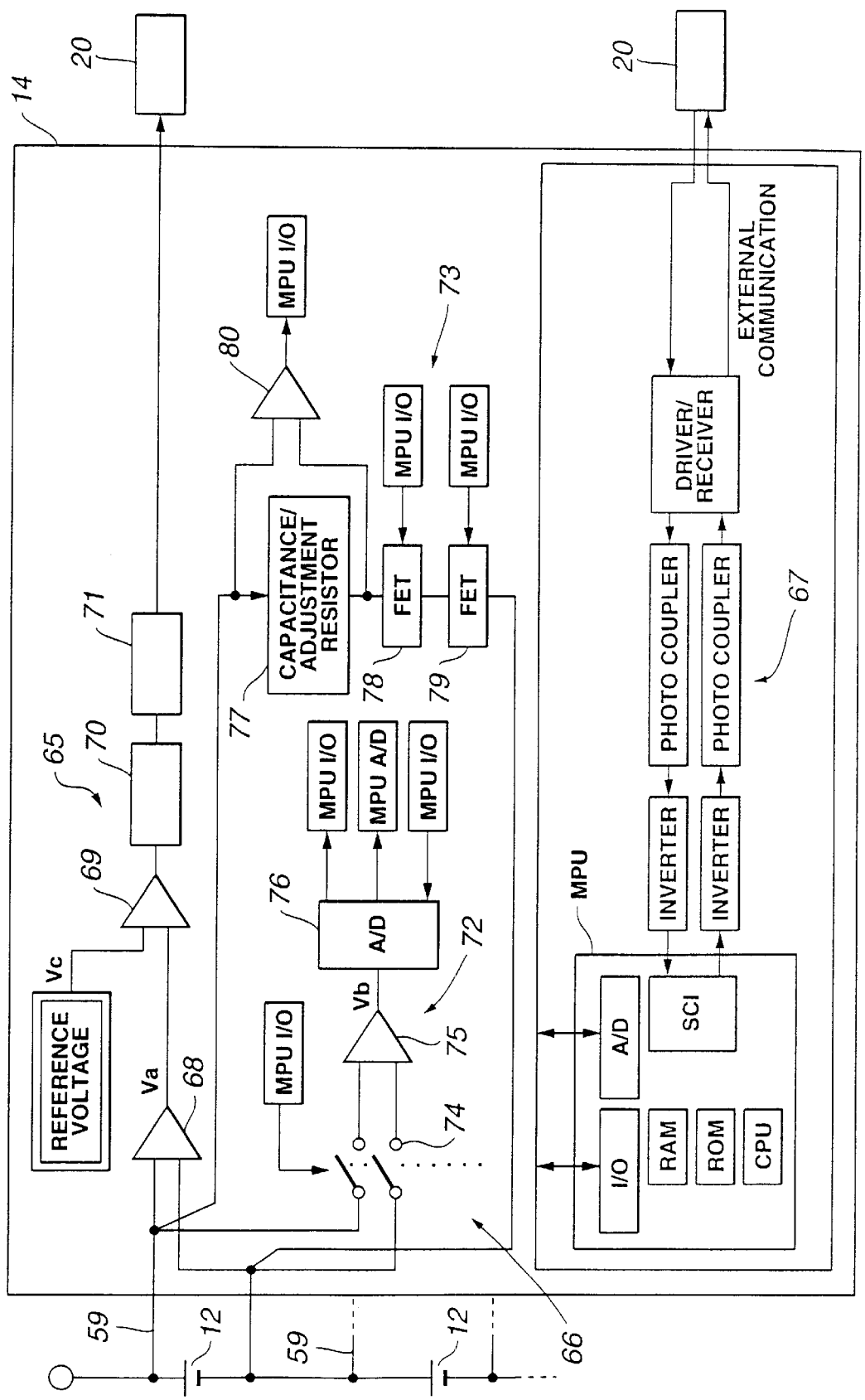
FIG. 17 shows a structure of the cell controller.

The above-described cell control unit 14 includes a unit battery monitoring unit 65 for separately monitoring the voltage of the eight constituent secondary batteries 12 of the battery module, a battery voltage control unit 66 for controlling the voltage of the individual batteries and a communication controller 67, as shown in FIG. 17. The cell control unit 14 is fed via the sensing core 59 with the voltage information of each secondary battery 12. The cell control unit 14 performs the above-mentioned control and signal transmission operations based on the voltage information.

The unit battery monitoring unit 65 is made up of a voltage detection unit 68, a comparator 69 with respect to the reference voltage, an inverter 70 and a photocoupler 71. The unit battery monitoring unit 65 detects the individual voltage of the secondary batteries 12 of the battery module by the voltage detection unit 68 and compares the detected voltage value Va to a reference voltage value Vc by the comparator 69. On detection that the detected voltage value Va of the secondary battery 12 of a given battery module is lower than the reference voltage value Vc, the unit battery monitoring unit 65 sends an alarm output from the transmission/reception terminal 20 via inverter 70 and photocoupler 71 to a controller.

The battery voltage controlling unit 66 is made up of a voltage detection unit 72 for detecting the voltage of the battery module and a capacity adjustment unit 73 for adjusting the capacity, and sends a control output based on the detected results. The voltage detection unit 72 is made up of a changeover switch group 74 for selecting eight secondary batteries 12 of the battery module, based on an output of the micro-processor MPU, a voltage detector 75 for detecting the voltage of the selected secondary battery 12, and an analog-to-digital converter 76. The voltage detection unit 72 detects the voltage value Vb of a pre-set number of lithium ion secondary batteries 12, based on the changeover operation of the changeover switch group 74, by the voltage detector 75, and converts the voltage value information by the analog-to-digital converter 76 to send out the converted data to the micro-processor MPU. The analog-to-digital converter 76 converts the data signals inputted or outputted from the micro-processor MPU.

The capacity detection unit 73 is made up of a capacity adjustment resistor 77 and transistors 78, 79, connected in series with each other and a capacity detector 80 connected to an input/output end of the capacity adjustment resistor 77. The capacity detection unit 73 sends the capacity information of the secondary battery 12, as detected by the capacity detector 80, to the micro-processor MPU. The micro-processor MPU sends the control signal derived from the capacity information to the transistors 78, 79 to actuate the capacity adjustment resistor 77 to adjust the capacity of the secondary batteries 12 undergoing voltage fluctuations.

The communication controller 67 takes charge of exchange of internal signals sent from the above-mentioned respective parts and exchange of control signals with the controller via the transmission/reception terminal 20. The communication controller 67 converts data of the detection or control signals via the inverter, photocoupler and a driver/receiver to exchange data between the microprocessor MPU and the controller.

The battery device 10 has the above-mentioned cell control unit 14 to monitor at all times the voltage as well as the capacity of the eight secondary batteries 12 connected in series with one another to constitute the battery module. If the battery device 10 detects by the cell control unit 14 that the voltage of a given secondary battery 12 falls below a pre-set voltage value, it outputs an alarm signal to outside via controller 4. In the hybrid car 1, an alarm signal is issued, or an alarm is indicated on a display, based on this alarm signal.

In the battery device 10, if a request command for data such as voltage or capacity of the secondary batteries 12 or the battery module is inputted from the controller 4 to a micro-processor 61 of the cell control unit 41, the corresponding data is outputted to the controller 4. If the battery device 10 detects by the voltage detection unit 72 the presence of the secondary battery 12 undergoing voltage fluctuations, the secondary battery 12 is discharged by a control output issued by the micro-processor 61 to lower the voltage by way of averaging the voltage.

Of course, the cell control unit 14 is not limited to the above-described configuration. The cell control unit 14 is fed via the sensing cord 59 with the voltage information of the respective secondary batteries 12 and the battery module. The cell control unit 14 also is fed from the temperature sensor 51 with the temperature information at a pre-set position in the modular casing 13. Moreover, the cell control unit 14 has the function of transmitting the information on the voltage, capacity or humidity and of receiving the control signal from the controller 4. Thus, the cell control unit 14 is able to perform various control operations by suitably combining these functions.

The battery device 10 is loaded on the battery loading unit 6 mounted below the flooring of the hybrid car 1, as described above. If the hybrid car 1 is run during summer or in a tropical area, it is heated to an elevated temperature under the effect of heat radiated from the road surface. On the other hand, if the hybrid car 1 is run during winter or in a frigid area, it is affected by the atmospheric air of low temperature. Moreover, the hybrid car I may be flooded with water during the rainy weather or under poor road conditions. Moreover, severe impact or vibrations may be applied on the hybrid car I under sustained running at a high speed or under bad road conditions.

In the battery device 10, the secondary batteries 12 or the battery module need to be monitored and controlled reliably by the cell control unit 14 even under the above-mentioned extremely poor using conditions. In the battery device 10, the cell control unit 14 is mounted on the upper portion of the modular casing 13 and accommodated in a sealed fashion in the exterior casing 11. Thus, the battery device 10 is suppressed from the effect of the radiant heat transmitted to the cell control unit 14 from the road surface.

In the battery device 10, the following impact tests were conducted to confirm that the desirable properties of the battery device 10 could be maintained even under the above-mentioned poor operating conditions. That is, a forward-backward left-right impact test at 30G×25 msec, a forward-backward left-right impact test at 70G×25 msec and a descent test of dropping a steel ball 50 mm in diameter weighing 500 g from a height of 200 mm, were conducted in the fully charged conditions of the secondary batteries 12 of the battery device 10. It was confirmed that, in the battery device 10, the monitoring and control operations could be carried out reliably by the cell control unit 14 in each of these impact tests.

Also, a 100-cycle thermal shock test, each cycle being made up of a humidity withstand test of exposing the battery device 10 to a 95% RH atmosphere at 60° C. for one hour, a water immersion test at a depth of 0 m, and alternate exposure to a −40° atmosphere and to a 70° C. atmosphere, was conducted on the battery device 10. It was confirmed that the monitoring and controlling operations of the secondary batteries and the battery module could be carried out reliably in each of these tests.

Figure 18:
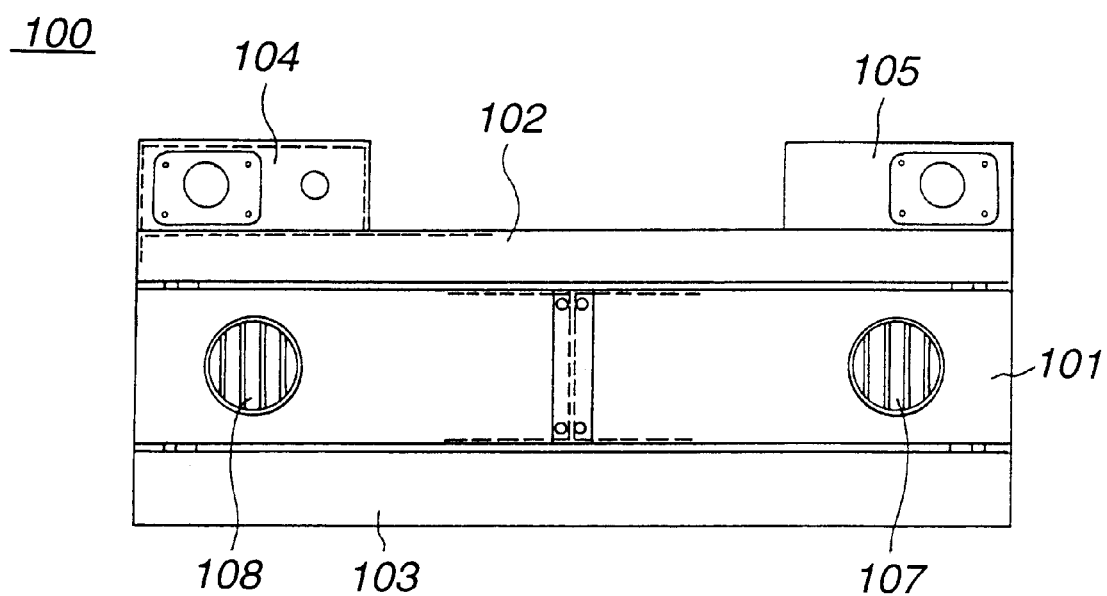
FIG. 18 is a plan view of a battery device according to a modification.

In the battery device 10, embodying the present invention, the respective cell control units 14 are mounted on the upper surfaces of the modular casing 13, as described above. The present invention is not limited to this configuration and may, for example, be applied to a battery device 100 shown in FIGS. 18 to 22 as a second embodiment. Referring to FIG. 18, the battery device 100 is made up of a modular casing 101, side cover members 102, 103 mounted on both lateral sides 101a, 101b thereof, and terminal units 104, 105 assembled to the side cover member 102. Meanwhile, since the battery device 100 is similar in its basic structure and operation to the above-described battery device 10 of the first embodiment, the component parts of the battery device 100 is not explained specifically in detail.

Figure 20:
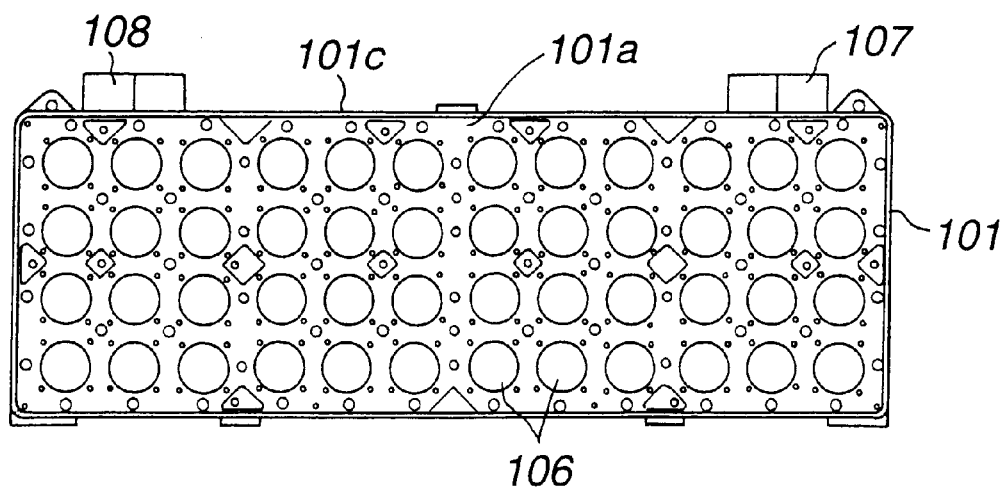
FIG. 20 is a front view of the modular casing.

The modular casing 101 has enclosed therein a battery casing having a width slightly smaller than the length of the secondary battery 12 and terminal openings 106 for exposing the positive terminal 12a and the negative terminal 12b of the secondary batteries 12 alternately to outside in the vertical and horizontal directions are formed in a lateral side 101a thereof in 4 vertical columns and in 12 horizontal rows, with the total number of the secondary batteries being 48, these terminal openings 106 have the inside diameters slightly smaller than the outside diameters of the secondary batteries 12 for retaining the end faces of the respective secondary batteries 12 housed in the battery casing, as shown in FIG. 20.

Although not shown, the opposite lateral side 101b of the modular casing 101 is opened, so that the modular casing 101 is constructed as a battery loading unit for loading the secondary batteries 12 in the battery casing. The modular casing 101 holds the opposite side of each secondary battery 12 housed in the battery casing. Although not shown, the side cover member 102 is formed with terminal openings, in register with the terminal openings 106 of the lateral side 101a, for alternately exposing the positive terminal 12a and the negative terminal 12b of the secondary batteries 12 to outside in the vertical and horizontal directions.

In the modular casing 101, 48 secondary batteries 12 are accommodated in the battery casing so that the positive terminal 12a and the negative terminal 12b are alternately exposed via neighboring terminal openings 106. These 48 secondary batteries 12 are connected in series, by the neighboring positive terminal 12a and negative terminal 12b being interconnected by connecting plate members, not shown. A set of 8 of the secondary batteries constitutes a battery module.

Figure 19:
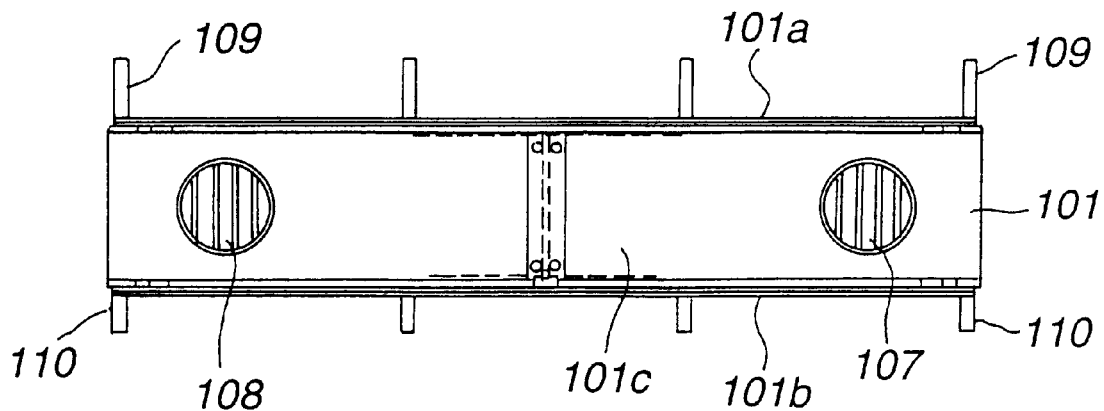
FIG. 19 is a plan view of a modular casing provided in the battery device of FIG. 18.

A top surface 101c of the modular casing 101 is formed as-one with the air intake duct 107 and an air exhaust duct 108, as shown in FIG. 19. The modular casing 101 is formed as-one with plural protuberant brackets 109 for assembling the side cover member 102 to its lateral side 101a. The modular casing 101 is also formed as-one with plural protuberant brackets 110 for assembling the side cover member 103 to its lateral side 101b.

Figure 21:
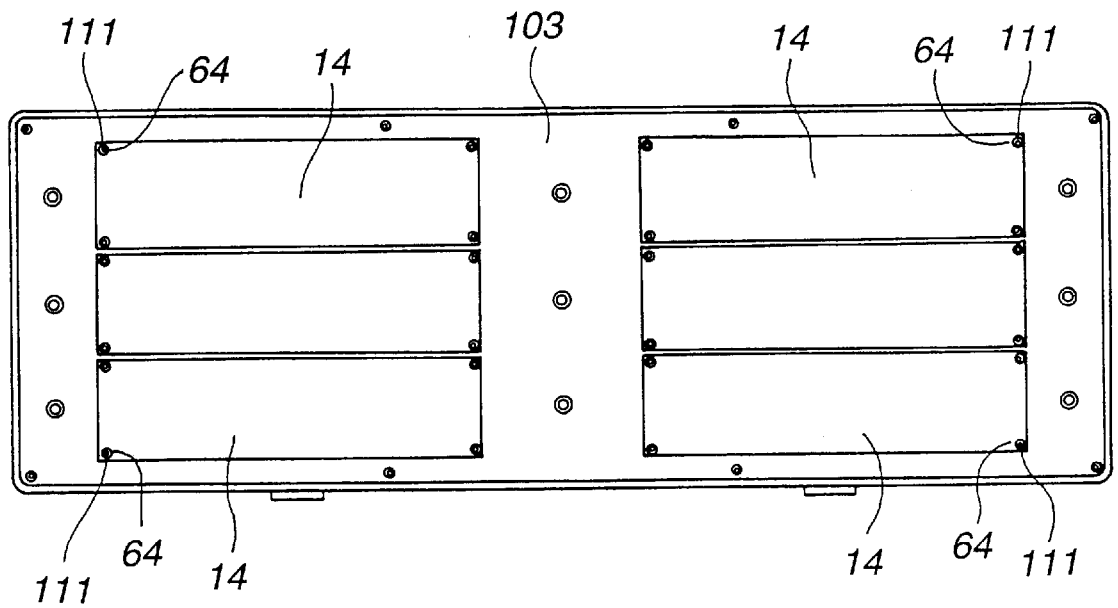
FIG. 21 is a back-side view of a side cover member provided on the battery device.
Figure 22:
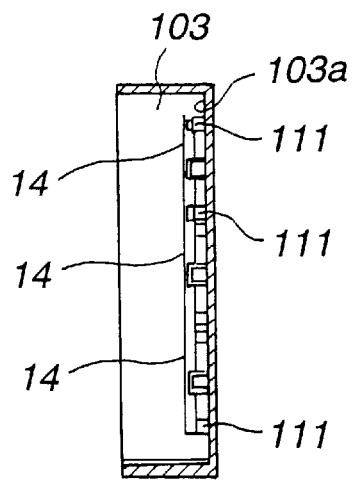
FIG. 22 is a longitudinal cross-sectional view of the side cover member.

The side cover member 103 is in the form of a box having a side facing the lateral side 101b of the modular casing 101 being opened, as shown in FIGS. 21 and 22. An inner surface 103a of the side cover member 103 is formed as-one with plural protuberant base plate attachment studs 111, as shown in FIG. 22. These base plate attachment studs 111 are used for mounting six cell control units 13, as will be explained subsequently. Although not shown in detail, each base plate attachment stud 111 has a base portion of a larger diameter formed as-one with a fitting fusing portion of a reduced diameter.

To the side cover member 103, the cell control units 14 are mounted by engaging the fitting fusing portions in fitting openings 64 formed at the four corners of the circuit board 60 and by fusing the distal ends of the fitting fusing portions, as shown in FIGS. 21 and 22. The cell control unit 14 are arranged in three horizontal rows and two vertical columns, as shown in FIG. 21. Each cell control unit 14 is connected via the sensing cord 59 to 8 secondary batteries 12 constituting the battery module.

The side cover member 103 is secured to the lateral side 101b of the modular casing 101 in a state in which the cell control units 14 are mounted on its inner surface and connected to pre-set secondary batteries 12 by the sensing cords 59. The side cover member 103 is secured to the modular casing 101 by set screws, not shown. Other components are assembled to the modular casing 101 of the battery device 100 in a similar manner.

Similarly to the battery device 10 of the above-described first embodiment, the battery device 100 is loaded on the battery loading unit 6 mounted below the floor of the hybrid car 1. When the hybrid car 1 is run at a high speed for prolonged time or on a bad road, severe impacts or vibrations are imposed on the hybrid car 1. These impacts or vibrations act in the vertical direction on the horizontal placed battery device 100.

The battery device 100 is mounted on the inner surface of the side cover member 103 by which the cell control unit 14 is assembled to the lateral side 101b of the modular casing 101. Stated differently, the cell control unit 14 is mounted at a position transverse to the direction of operation of the large impacts or vibrations. Thus, the battery device 100 is suppressed from adverse effects of vibrations, applied to the mounting portion of the cell control unit 14, thus eliminating special anti-vibration structures. It is noted that vibration tests were conducted on the battery device 100 in each of the horizontal forward-backward and in the left-right directions with 1.5G load and in the up-and-down direction with 2.5G load, with the sweeping rate of 10 Hz to 100 Hz, with the number of times of the vibration tests being 107 in each direction. It was confirmed that the monitoring and controlling operations could be performed by the cell control unit 14 reliably on the secondary batteries 12.

The present invention is not limited to the battery device 10 shown in the first embodiment or the battery device 100 shown in the second embodiment. Although the cell control unit 14 is designed to perform the monitoring and controlling operations on the battery module made up of eight secondary batteries, it is possible to perform the monitoring and controlling operations on a battery module made up of a larger number of modules. In addition, the present invention may be applied not only to the hybrid car 1 as described above, but also to other mobile systems, such as electric vehicles, vessels carrying the battery devices or unmanned explorers.

What is claimed is:

1. A battery device for loading on a mobile body comprising:
    a modular casing of synthetic resin encased within an exterior casing, said modular casing comprising two lateral sides including a number of terminal openings both lateral sides;
    a number of secondary batteries loaded in the modular casing with positive electrode terminals and negative electrode terminals alternately disposed in neighboring terminal openings of the modular casing, said secondary batteries being connected in series with one another, with a plurality of the secondary batteries being grouped together as a battery module, said secondary batteries comprising a plurality of such battery modules;
    a plurality of cell control units corresponding to the number of said battery modules of the secondary batteries, each cell control unit including at least one of a micro-processor, circuit elements and electronic components loaded on a circuit board to provide a control signal, each cell control unit being connected to a sensing line connected to each secondary battery, said cell control units each having the functions of detecting and controlling the voltage of each battery module and each secondary battery, of detecting humidity in the exterior casing, and inputting/outputting the control signal from the cell control unit; and
    the exterior casing of a synthetic resin material, split into at least two casing halves, said exterior casing defining a housing space for accommodating said modular casings in the assembled state of the casing halves; wherein
        positive electrode terminals and negative electrode terminals of said groups of secondary batteries and input/output terminals of said cell control units are provided in said exterior casing; and wherein
        said modular casing, containing said secondary batteries and each having said cell control units assembled thereon, is housed in said housing space to constitute an all-in-one unit.

2. The battery device for loading on a mobile body according to claim 1 wherein
    each cell control unit is mounted on a side of said modular casing corresponding to an upper side when the battery device is loaded on the mobile device.

3. The battery device for loading on a mobile body according to claim 1 wherein
    each cell control unit is mounted on a side of said modular casing corresponding to a lateral side along the height-wise direction when the battery device is loaded on the mobile device.

4. The battery device for loading on a mobile body according to claim 1 wherein
    the micro-processor in each cell control unit is mounted on said cell control unit at a laterally offset position with respect to the center of gravity position.

5. The battery device for loading on a mobile body according to claim 1 wherein
    said circuit boards of said cell control unit are mounted on a block-shaped mounting portion formed on said modular casing to delimit a gap between the circuit boards and the modular casing.

6. The battery device for loading on a mobile body according to claim 1
    and further comprising a mounting portion formed on said modular casing and a mounting opening formed on said circuit board; wherein
        each cell control unit is mounted in position by having a fitting fusion portion set upright on the mounting portion being fitted in the mounting opening and by thermally fusing said fitting fusion portion.

7. The battery device for loading on a mobile body according to claim 1 wherein
each cell control unit is thrust towards the modular casing by a thrust pin protuberantly formed on the inner surface of the exterior casing when the modular casing is housed in said housing space of said exterior casing.

8. The battery device for loading on a mobile body according to claim 1 wherein
said secondary battery is a lithium ion secondary battery.

9. The battery device for loading on a mobile body according to claim 1 wherein
said exterior casing is provided with an air intake duct for taking in air for cooling the secondary batteries and an air exhaust duct for discharging air taken in via said air intake duct and circulated through said housing space to cool the secondary batteries.

* * * * *